United States Patent [19]

Ostrup et al.

[11] Patent Number: 4,961,305
[45] Date of Patent: Oct. 9, 1990

[54] AGRICULTURAL IMPLEMENT FOR HARVESTING OF CORN AND OTHER GRAIN FRUITS

[75] Inventors: Heinrich Ostrup, Harsewinkel; Lambert Sanders, Herzebrock-Clarholz, both of Fed. Rep. of Germany

[73] Assignee: Claas OHG, Harsewinkel, Fed. Rep. of Germany

[21] Appl. No.: 227,899

[22] Filed: Aug. 3, 1988

[30] Foreign Application Priority Data

Aug. 13, 1987 [DE] Fed. Rep. of Germany ....... 3726967

[51] Int. Cl.$^5$ ............................................. A01D 45/02
[52] U.S. Cl. ........................................... 56/98; 56/102
[58] Field of Search ...................... 56/98, 60, 102, 94, 56/295, DIG. 17

[56] References Cited

U.S. PATENT DOCUMENTS

| 2,670,775 | 3/1954 | Elofson | 239/650 |
| 3,815,823 | 6/1974 | Johnson | 239/650 |
| 4,539,799 | 9/1985 | Kalverkamp | 56/60 |

FOREIGN PATENT DOCUMENTS

| 2735717 | 2/1978 | Fed. Rep. of Germany | 56/503 |
| 2909412 | 10/1979 | Fed. Rep. of Germany | 56/503 |

Primary Examiner—Bruce M. Kisliuk
Assistant Examiner—Gay Ann Spahn
Attorney, Agent, or Firm—Michael J. Striker

[57] ABSTRACT

An agricultural implement for harvesting corn or other grain fruits to be used especially as a front implement as a harvester thresher comprises a drawing unit, a unit forming a picking gap for separating cobs from a fruit, a picking roller surrounded by a partial casing and having a cylindrical base body with a plurality of impact plates provided with cutouts, a cutting unit provided with a plurality of cutting members extending through the cutouts, the cutting unit having an end which is opposite to the cutting members, a joint traverse supporting the cutting unit at the end independently of the partial casing the turnable about an axis extending parallel to an axis of the picking roller, the traverse together with the cutting unit being turnable against a spring force about an axis which extends parallel of the axis of the base body and being arrestable upon turning.

4 Claims, 1 Drawing Sheet

AGRICULTURAL IMPLEMENT FOR HARVESTING OF CORN AND OTHER GRAIN FRUITS

BACKGROUND OF THE INVENTION

The present invention relates to an agricultural implement for harvesting corn or other grain fruits, especially a front implement for a harvester thresher.

More particularly it relates to such an implement which has a drawing device, a picking gap for separating of cobs from a fruit, and a picking roller which is a single roller for each plant row and is surrounded by a partial casing, wherein the picking roller is formed as a cylindrical base body provided with a plurality of impact plates having cutouts for passing a cutter plate therethrough, and finally a traverse which extends parallel to the axis of the picking roller and supports at one end individual cutting means of the cutting blade.

Agricultural implements of the above mentioned general type are known in the art. One of said agricultural implements is disclosed for example in the patent application of the applicant No. 026,522. In the construction disclosed in this application the cutter blade is adjustable in direction to the base body depending on a type of agricultural product to be harvested and on wear. However, it is fixedly connected with the traverse which in turn is fixedly connected with the machine. It has been shown in practice that damage always occurs to the cutter blade when, in addition to the agricultural product to be harvested, foreign bodies, for example rocks or branches are drawn in. Furthermore, in the known agricultural implements it is impossible without significant mounting expenses to pull the fruit stem without being chopped from the tearing roller through the picking gap. For this purpose the whole cutter blade or the traverse which carries the cutter blade must be dismantled.

SUMMARY OF THE INVENTION

Accordingly, it is an object of the present invention to provide an agricultural implement for harvesting corn and other grain fruits of the above mentioned general type which avoids the disadvantages of the prior art.

More particularly, it is an object of the present invention to provide an agricultural implement for harvesting corn and other grain fruits, which provides both an effective protection of a cutter blade from foreign bodies, and simultaneously provides for the possibility to put a chopping device by a simple grip, outside a force.

In keeping with these objects and with others which will become apparent hereinafter, one feature of the present invention resides, briefly stated, in an agricultural implement particularly for harvesting of corn and other grain fruits, in which a transverse traverse with a cutting blade mounted thereon are turnable about an axis which extends parallel to an axis of a base body of a picking drum against a spring force, and can be arrested as needed.

When the agricultural implement is designed in accordance with the present invention it achieves the above specified objects.

In accordance with another advantageous feature of the present invention, a lever is fixedly connected with the traverse and has a free end engaging with a pulling spring.

A further feature of the present invention is that an adjusting lever is connected with the traverse and carries a clamping pin which is guided in a longitudinal opening of a machine wall and is fixable.

Finally a still further feature of the present invention is that the traverse together with the cutting blade is convertible between at least two positions, and the wall is provided with two receiving openings for the axle which defines the axis of turning of the traverse with the cutting blade.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF A PREFERRED EMBODIMENT

Figure 1:
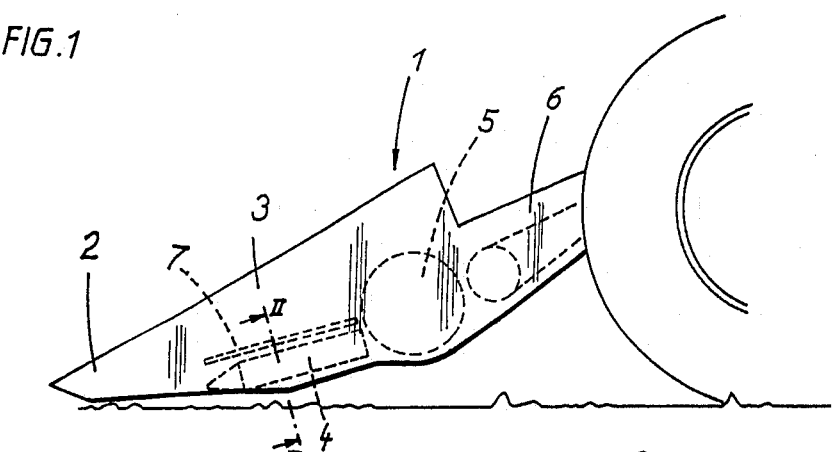
FIG. 1 is a side view of a corn harvesting implement in accordance with the present invention.

Reference numeral 1 identifies a grain harvesting implement which is composed of two plates 2 for one harvesting row. Both plates 2 incorporate guiding sheets 3 and are associated with a pickup roller 4. Corn cobs which are separated from stalks are transported to a conveyor screw 5 and from there, through an inclined conveyor 6, are further transported for example to a collecting container or a threshing device.

Figure 2:
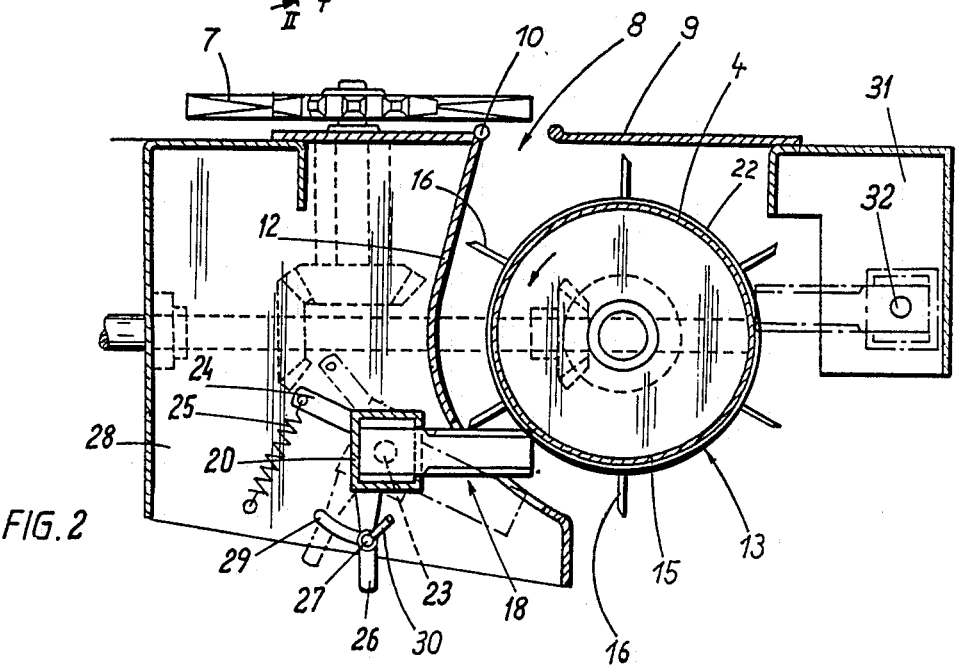
FIG. 2 is a view showing a section of the inventive corn harvesting implement taken on the line II—II in FIG. 1.

FIG. 2 shows a support of a pulling chain 7 which draws the standing stem into a picking gap 8 and also supplies the separated cobs to the transverse conveyor screw 5. The picking gap is limited at one side by a displaceable guiding sheet 9, and on the other side by a round iron piece which serves as a braking edge.

The drawing roller 4 is supported under the guiding sheet 9 in a driveable manner and locally surrounded by a partial casing 12; said partial casing including an opening. The partial casing 12 is connected with a round iron piece 10 and can be formed of one-piece or articulately connected with it. The drawing roller 4 is formed as a cylindrical base body 13 which has a drawing tip with a truncated conical shape provided with screw coils. A housing 15 of the base body 13 has impact plates 16. The impact plates 16 are provided with cutouts which are spaced from one another and not shown in the drawing. The cutouts are formed such as disclosed in the copending patent application Ser. No. 227,762.

A cutter blade 18 extends through the above mentioned cutouts of the impact plates 16. The individual cutters of the cutter blade are mounted on a traverse 20. The traverse 20 is turnably supported on an axle 23. The cutter blade 18 is pressed into a groove 22 of the base body by a lever 24 which is fixedly connected with the traverse and engages at its opposite end with a spring 25. For preventing the abutment of the cutter blade 18 against the casing 15 of the base body, the traverse 20 has an adjusting lever 26 which carries a clamping pin 27. The latter engages in an arcuate elongated hole 29 which is provided in a wall 28.

In the position shown in FIG. 2, the pin 27 is turned in the longitudinal opening 29 as far as possible to the right. It forms thereby an abutment and prevents a pressing of the cutter blade 18 under the action of the spring 25, against the base of the groove 22. When a foreign body reaches the region between the partial casing 12 and the base body 13 and it is of such a nature that it cannot be cut by the cutter blade 18, the cutter blade 18 turns in clockwise direction against the force of the spring 25 for preventing damages to the same. When the whole chopping device is turned off so as not to operate, the cutter blade 18 can be turned in counterclockwise direction manually or by a not shown cylinder-piston unit, until the clamping pin 27 abuts against the left limit of the elongated opening 29. Then the pin 27 is locked by turning of the handle 30 so that the adjusting lever 26 is held in its not shown left position.

Instead of turning the traverse 20 and the cutter blade 18 connected with it, the whole unit can be dismantled by releasing two lateral not shown mounting screws and assembled in a position shown in broken lines. This prevents depositing of fiber or hard parts in the grooves 22 on the cutters. They are completely combed out by the cutter blade. FIG. 2 also shows that a wall 31 is provided with one receiving opening 32 for receipt of the axle 23.

It will be understood that each of the elements described above, or two or more together, may also find a useful application in other types of constructions differing from the types described above.

While the invention has been illustrated and described as embodied in an agricultural implement for harvesting corn or other grain fruits to be used especially as a front implement as a harvester thresher, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An agricultural implement for harvesting corn or other grain fruits to be used especially as a front implement as a harevester thresher, comprising drawing means; means forming a picking gap for separating cobs from a fruit; a picking roller surrounded by a partial casing and having a cylindrical base body with a plurality of impact plates provided with cutouts, said partial casing including an opening; cutting means provided with a plurality of cutting members extending through said opening and said cutouts, said cutting means having an end which is opposite to said cutting members; a joint traverse supporting said cutting means at said end independently of said partial casing and turnable about an axis extending parallel to an axis of said picking roller, said traverse together with said cutting means being turnable between two end positions against a spring force about an axis which extends parallel to an axis of said base body and being arrestable upon turning; a pulling spring cooperating with said traverse so as to produce said spring force; a lever which is fixedly connected with said traverse and has a free end engaging said pulling spring; an adjusting lever connected with said traverse and carrying a clamping pin; and means forming a longitudinal guiding opening in which said clamping pin is guided and fixed, said means including a machine wall in which said longitudinal opening is provided.

2. An agricultural implement as defined in claim 1, wherein said traverse with said cutting means is convertable between at least two positions; and further comprising means forming at least two receiving openings for receiving an axle which defines said axis of turning of said traverse with said cutting means.

3. An agricultural implement as defined in claim 2; and further comprising a wall provided with said two receiving openings for receiving said axle which defines said axis of turning of said traverse with said cutting means.

4. An agricultural implement for harvesting corn or other grain fruits to be used especially as a front implement as a harvester thresher, comprising drawing means; means forming a picking gap for separating cobs from a fruit; a picking roller surrounded by a partial casing and having a cylindrical base body with a plurality of impace plates provided with cutouts, said partial casing including an opening; cutting means provided with a plurality of cutting members extending through said opening and said cutouts, said cutting means having an end which is opposite to said cutting members; a joint traverse supporting said cutting means at said end independently of said partial casing, said joint traverse together with said cutting means being turnable out of its cutting position to a neutral position, said cylindrical base body having a groove, said cutting members having gree ends engageable in said groove of said base body.

* * * * *